(12) United States Patent
Munro

(10) Patent No.: US 11,787,245 B2
(45) Date of Patent: Oct. 17, 2023

(54) THEFT-PROOF TRAILER HITCH TONGUE

(71) Applicant: Versatile Products, Inc., Lafayette, LA (US)

(72) Inventor: Michael Munro, Lafayette, LA (US)

(*) Notice: Subject to any disclaimer, the term of this patent is extended or adjusted under 35 U.S.C. 154(b) by 134 days.

(21) Appl. No.: 17/395,705

(22) Filed: Aug. 6, 2021

(65) Prior Publication Data

US 2023/0037989 A1 Feb. 9, 2023

(51) Int. Cl.
*B60D 1/28* (2006.01)
*B60D 1/52* (2006.01)
*B60D 1/26* (2006.01)
*B60D 1/07* (2006.01)
*B60D 1/167* (2006.01)

(52) U.S. Cl.
CPC ............ *B60D 1/28* (2013.01); *B60D 1/07* (2013.01); *B60D 1/167* (2013.01); *B60D 1/26* (2013.01); *B60D 1/52* (2013.01)

(58) Field of Classification Search
CPC .......... B60D 1/07; B60D 1/075; B60D 1/167; B60D 1/26; B60D 1/28; B60D 1/52
See application file for complete search history.

(56) References Cited

U.S. PATENT DOCUMENTS

| 3,281,162 | A | * | 10/1966 | Carson | B60D 1/167 |
| | | | | | 280/479.3 |
| 3,583,728 | A | * | 6/1971 | Cornell | B60D 1/249 |
| | | | | | 280/503 |
| 3,938,830 | A | * | 2/1976 | Lane | B60D 1/06 |
| | | | | | 280/491.1 |
| 4,022,489 | A | * | 5/1977 | Shattles | B60D 1/56 |
| | | | | | 280/502 |
| 4,416,466 | A | | 11/1983 | Park | |
| 4,417,748 | A | | 11/1983 | Dortch | |

(Continued)

FOREIGN PATENT DOCUMENTS

| WO | 2008055342 | 10/2007 |
| WO | 2011073654 | 6/2011 |

OTHER PUBLICATIONS

Https://www.ganderoutdoors.com/hitch-n-go-cargo-cart-124910.html?gclid=CjwKCAjwxuuCBhATEiwAlllz0RdGf3Bp51iwjhJBCu7i5ORYsblGaCKuoxR00hAEJDknzRbcGjtY5RoCUncQAvD_BwE&gclsrc=aw.ds.

*Primary Examiner* — Tony H Winner
*Assistant Examiner* — Maurice L Williams
(74) *Attorney, Agent, or Firm* — Gregson IP Law LLC

(57) ABSTRACT

An article of manufacture for providing a theft-proof trailer hitch tongue is disclosed. The trailer hitch tongue has two or more mating receivers coupled to a trailer each of the two or more mating receivers having a plurality of locking notches about an inside surface of each mating receiver in a specific orientation, two or more removable arms for engaging the two or more mating receiver, each of the removable arms having a hitch tongue end and a connecting end and together form a split tongue of the trailer hitch, a plurality of locking pegs arranged on each of the two or more removable arms, the plurality of locking pegs being configured to simultaneously engage the plurality of locking notches when the hitch tongue end of the removable arms are inserted in the corresponding mating receiver, and locking latches components on the connecting end of each of the removable arms, the locking latches couple together after the hitch tongue end of the removable arms are inserted in the corresponding mating receiver.

9 Claims, 5 Drawing Sheets

(56) References Cited

U.S. PATENT DOCUMENTS

| | | | | |
|---|---|---|---|---|
| 4,509,769 A * | 4/1985 | Weber | ............... | B60D 1/40 |
| | | | | 280/491.1 |
| 4,768,803 A * | 9/1988 | Hewitt | ............... | B60D 1/54 |
| | | | | 280/480 |
| 4,861,061 A * | 8/1989 | Frantz | ............... | B60D 1/54 |
| | | | | 280/491.4 |
| 4,978,134 A * | 12/1990 | Dahl | ............... | B60D 1/54 |
| | | | | 280/498 |
| 5,071,153 A * | 12/1991 | Duncan | ............... | B60D 1/167 |
| | | | | 280/491.4 |
| 5,147,095 A * | 9/1992 | Duncan | ............... | B60D 1/167 |
| | | | | 280/491.4 |
| 5,263,745 A * | 11/1993 | Storey | ............... | B60D 1/167 |
| | | | | 280/483 |
| 5,711,542 A * | 1/1998 | Kendall | ............... | B60D 1/167 |
| | | | | 280/491.4 |
| 5,873,595 A * | 2/1999 | Hinte | ............... | B60D 1/02 |
| | | | | 280/495 |
| 6,173,941 B1 | 1/2001 | Johnston | | |
| 6,213,492 B1 | 4/2001 | Ceccarelli, III | | |
| 6,502,847 B1 * | 1/2003 | Greaves | ............... | B60D 3/00 |
| | | | | 280/491.1 |
| 6,511,250 B2 * | 1/2003 | Lindsay | ............... | B62D 27/06 |
| | | | | 403/230 |
| 6,685,212 B1 * | 2/2004 | Penlerick | ............... | B60D 1/143 |
| | | | | 280/495 |
| 6,783,266 B2 | 8/2004 | McCoy | | |
| 6,851,696 B1 | 2/2005 | Hensley | | |
| 6,902,181 B1 | 6/2005 | Dye | | |
| 6,935,829 B2 * | 8/2005 | Smith | ............... | B60P 1/6481 |
| | | | | 414/498 |
| 7,128,330 B2 | 10/2006 | Krauss | | |
| 7,222,873 B2 | 5/2007 | Rodgers | | |
| 7,364,180 B2 | 4/2008 | Hensley | | |
| 7,425,014 B1 | 9/2008 | Palmer | | |
| 7,850,192 B2 | 12/2010 | Ceccarelli | | |
| 7,909,350 B1 | 3/2011 | Landry | | |
| 8,042,825 B2 | 10/2011 | Jamieson | | |
| 8,235,412 B2 | 8/2012 | Norton | | |
| 8,388,017 B2 | 3/2013 | Alexander | | |
| 8,448,978 B2 | 5/2013 | Alvarino | | |
| 8,573,629 B1 * | 11/2013 | Kraai | ............... | B60D 1/1675 |
| | | | | 280/491.4 |
| 9,056,639 B2 | 6/2015 | Bank | | |
| 9,359,179 B2 | 6/2016 | Krug | | |
| 9,527,355 B1 | 12/2016 | Blevins | | |
| 9,533,623 B1 | 1/2017 | Descoteaux | | |
| 9,707,811 B2 | 7/2017 | Columbia | | |
| 9,725,024 B1 | 8/2017 | Davis | | |
| 10,081,402 B1 | 9/2018 | Davis | | |
| 10,112,451 B2 | 10/2018 | Mikesell | | |
| 2006/0145461 A1 | 7/2006 | Anderson | | |
| 2006/0228201 A1 | 10/2006 | Lenceski | | |
| 2007/0080516 A1 | 4/2007 | Simmons | | |
| 2010/0213687 A1 | 8/2010 | Mcdaniel | | |
| 2011/0248228 A1 | 10/2011 | Gause | | |
| 2019/0322208 A1 * | 10/2019 | Robinson | ............... | B60Q 1/50 |
| 2021/0291599 A1 * | 9/2021 | Bowe | ............... | B60D 1/54 |

* cited by examiner

THEFT-PROOF TRAILER HITCH TONGUE

TECHNICAL FIELD

This application relates in general to an article of manufacture for providing towing devices, and more specifically, to an article of manufacture for providing a theft-proof trailer hitch tongue.

BACKGROUND

Utility and/or heavy equipment trailers that are left unattended, for whatever reason, are very susceptible to theft, even if they have padlocks on the hitch ball or tow bar. Basically, anyone with a proper vehicle and hitch, can sever the padlock and steal any trailer. Trailers loaded with dozers, excavators, tractors, 4-wheelers, boats, or many other expensive items, along with smaller utility trailers for personal use are stolen every day. Once stolen, many are modified or altered, and most are taken out of this country into Mexico, never to be found again.

Therefore, a need exists for an article of manufacture for providing a theft-proof trailer hitch tongue. The present invention attempts to address the limitations and deficiencies in prior solutions according to the principles and example embodiments disclosed herein.

SUMMARY

In accordance with the present invention, the above and other problems are solved by providing an article of manufacture for providing a theft-proof trailer hitch tongue according to the principles and example embodiments disclosed herein.

In one embodiment, the present invention is an article of manufacture for providing a theft-proof trailer hitch tongue. The trailer hitch tongue has two or more mating receivers coupled to a trailer each of the two or more mating receivers having a plurality of locking notches about an inside surface of each mating receiver in a specific orientation, two or more removable arms for engaging the two or more mating receiver, each of the removable arms having a hitch tongue end and a connecting end and together form a split tongue of the trailer hitch, a plurality of locking pegs arranged on each of the two or more removable arms, the plurality of locking pegs being configured to simultaneously engage the plurality of locking notches when the hitch tongue end of the removable arms are inserted in the corresponding mating receiver, and locking latches components on the connecting end of each of the removable arms, the locking latches couple together after the hitch tongue end of the removable arms are inserted in the corresponding mating receiver.

In another aspect of the present invention, each of the removable arms rotate within the corresponding mating receiver after the hitch tongue end of the removable arms are inserted in the corresponding mating receiver permitting the locking notches and the locking pegs to engage each other simultaneously.

In another aspect of the present invention, the locking latches components on the connecting ends of the two or more removable arms engage each other when a latching component of the connecting end of a first removable arm is placed within a cradle on the connecting end of a second removable arm and a latch arm pivots about a hinge coupled to the first removable arm across the latching component within the cradle to align a latch pinhole in the latch arm to a upright peg coupled to second removable arm.

In another aspect of the present invention, a locking pin is inserted through the latch pinhole and a peg pinhole of the upright peg to secure the latch holding the connecting ends of the removable arms together.

In another aspect of the present invention, the connecting end of the removable arm having the cradle further comprises a trailer hitch for attachment to a towing vehicle.

In another aspect of the present invention, the two or more removable arms have a left removable arm member having a left trailer tongue for engaging a left receiver on the trailer and a left enter tongue on an opposite end of the left removable arm member, a right removable arm member having a right trailer tongue for engaging a right receiver on the trailer and a right center tongue on an opposite end of the right removable arm member, and a center removable arm. The center removable arm has a center arm member having a trailer end and a receiving end, a left center arm receiver for accepting the left center tongue of the left removable arm after the left trailer tongue end engages the left receiver on the trailer, a right center arm receiver for accepting the right center tongue of the right removable arm after the right trailer tongue end engages the left receiver on the trailer, and a locking latch coupled to the center arm member by a latching hinge, the locking latch having a flange and a latch pinhole for engaging an upward peg with a peg pinhole coupled to the center arm member.

In another aspect of the present invention, a locking pin is inserted through the latch pinhole and a peg pinhole of the upright peg to secure the latch holding the tongue ends of the removable arms within their respective receivers.

In another aspect of the present invention, each of the removable arms comprises at least two locking pegs for engaging locking notches of their respective mating receivers.

In another aspect of the present invention, the locking pegs on each of the removable arms have a unique orientation.

In another aspect of the present invention, the center removable arm further comprises a trailer hitch for attachment to a towing vehicle.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
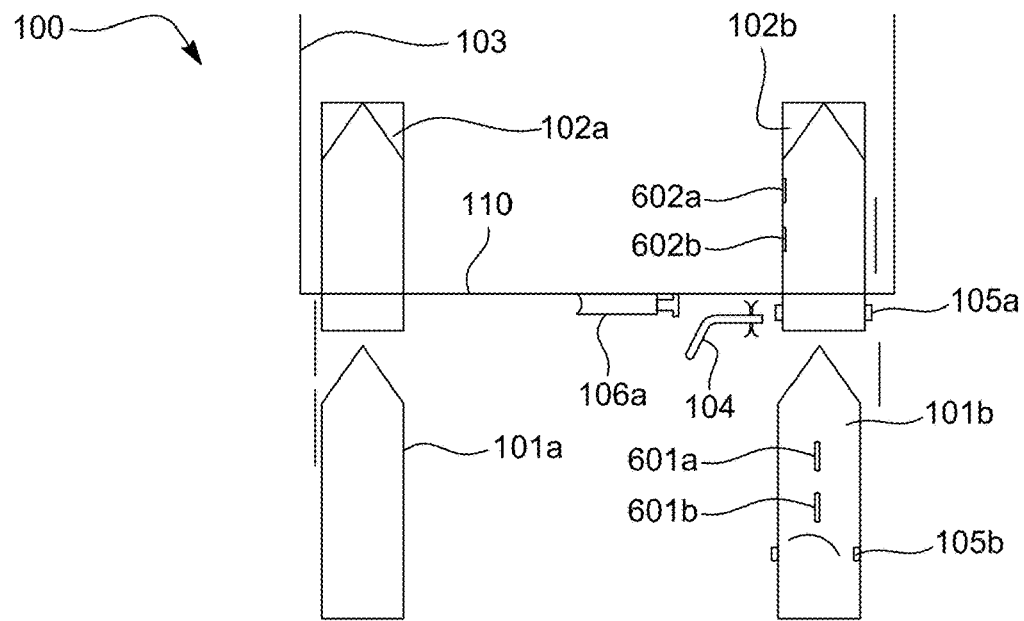
FIG. 1 illustrates a top view an example embodiment of an article of manufacture providing a theft-proof trailer hitch tongue to the present invention.

This application relates in general a system and method for providing towing devices, and more specifically, to an article of manufacture for providing a theft-proof trailer hitch tongue according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual," and "user" refer to an entity, e.g., a human, using an article of manufacture for providing a theft-proof trailer hitch tongue associated with the invention. The term user herein refers to one or more users.

The term "invention" or "present invention" refers to the invention being applied for via the patent application with the title "Theft-Proof Trailer Hitch Tongue." Invention may be used interchangeably with tongue.

In general, the present disclosure relates an article of manufacture for providing a theft-proof trailer hitch tongue 100 according to the present invention. To better understand the present invention, FIG. 1 illustrates an example embodiment of an article of manufacture providing a theft-proof trailer hitch tongue 100 to the present invention. A trailer without a tongue and hitch ball would be very hard to steal. Therefore, a removable tongue 101a-b would be the first step to making a trailer very hard to steal. Further, as one of the problems mentioned above, removing the tongue 101a-b makes a trailer frame shorter once the tongue is removed, which saves space and can contribute to more elaborate space saving features described later.

A more detailed description of this particular theft proof specialized item is a removable trailer tongue 100 that has two or three connecting sections or arms that independently weigh considerably less than the tongue as a whole, further designed for easy removal from the trailer, easy storage (inside a vehicle trunk), and easy re-installing onto the trailer. The unique security or theft proof feature is that one or more of the tongue sections 101a-b or arms have a special "Key-Locking" feature 601a-b, 602a-b ("key lock or key locking") on one or more of the removable sections or arms 101a-b. The tongue sections 101a-b or arms with the key locking feature herein referred to as a ("theft-proof tongue").

The removable sections or arms 101a-b engage mating receivers 102a-b that is attached to a frame 103 of the trailer 110. When the removable sections or arms 101a-b are inserted into the receivers 102a-b, one or more locking pins 104 are inserted through a set of pin receivers 105a-b through the removable sections or arms 101a-b and mating receivers 102a-b. This locking pin prevents the removable sections or arms 101a-b from sliding out of the mating receivers 102a-b. A pivot jack 106a is coupled to the frame 103 of the trailer 110 to support the trailer when the tongues 101a-b are removed. Operation of connecting the removable sections or arms 101a-b to the trailer receivers 102a-b is disclosed in detail with respect to FIG. 3 below.

Figure 2:
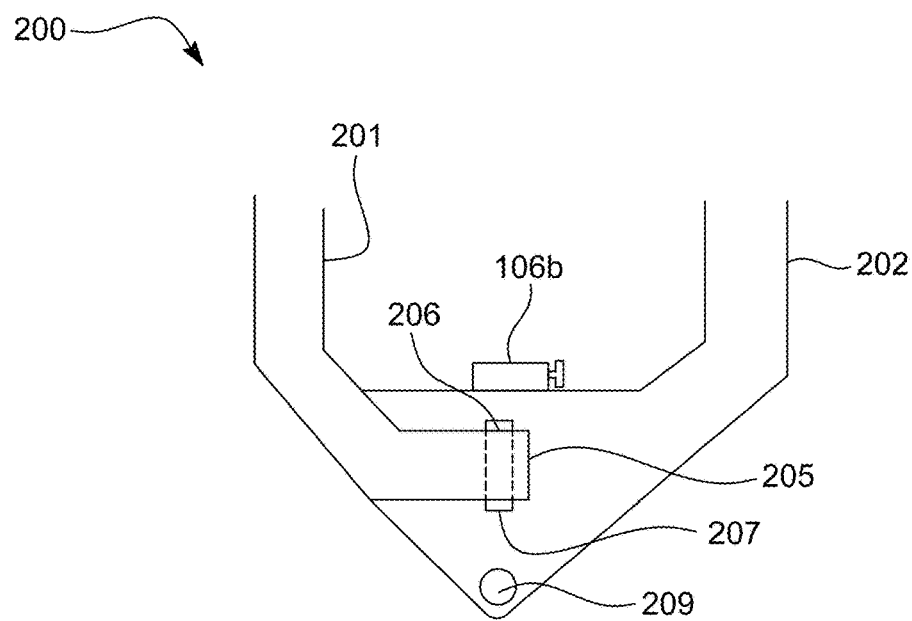
FIG. 2 illustrates a top view an article of manufacture providing a theft-proof trailer hitch tongue in a closed position according to the present invention.

FIG. 2 illustrates a functional diagram of a manufacturing process for making an article of manufacture providing a theft-proof trailer hitch tongue in a closed position according to the present invention. The key locking feature is a varying sequence of female notches 602a-b shown in FIG. 6 that are inside the receiver 102a-b that the section or arm 101a-b is inserted into. These hidden female notches 602a-b eliminate the duplication of the notch sequence. Examples of these various tongues are shown in detail in regard to FIG. 6. Since the sections are arms are separate from each other, and the overall weight of the whole tongue 200 is divided by the number of sections or arms 201-202, each section is therefore light enough and maneuverable enough to remove, store, and reinstall with ease. A tongue jack 106b, similar to the pivot jack 106a, supports the trailer when the removable sections or arms 101a-b are within the mating receivers 102a-b. A first arm 201 has a latching end 205 that engages a cradle 206 to securely connect the arms 201-202 together. The latch 206 and cradle 207 are described in detail in reference to FIG. 3 below. The opposite ends of the arms 201-202 engage a pair of receivers 102a-b as shown in FIG. 1.

Figure 3A:
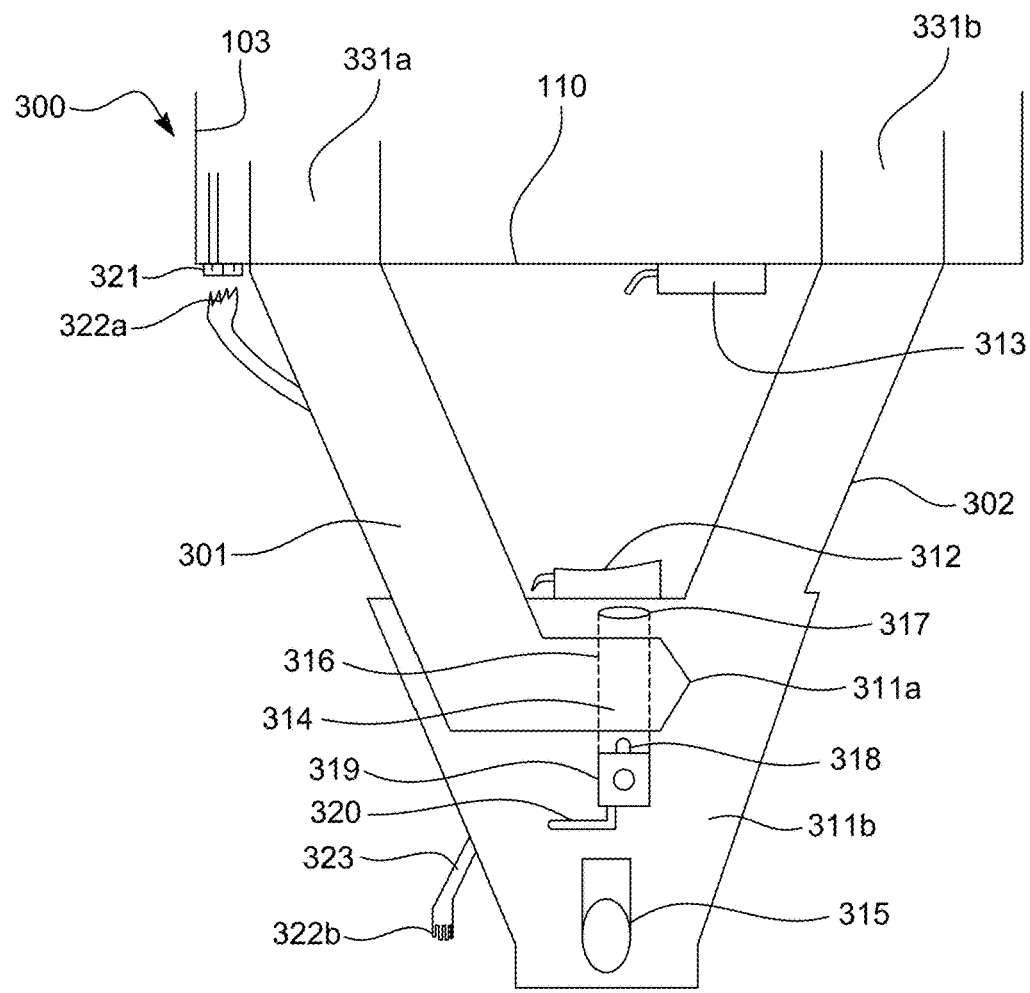
FIGS. 3a-b illustrate a top view another example embodiment of an article of manufacture providing a theft-proof trailer hitch tongue according to the present invention.
Figure 3B:
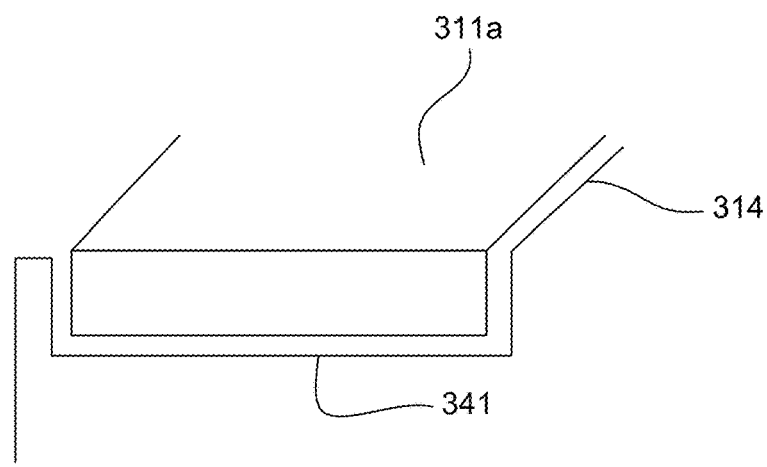

FIGS. 3a-b illustrates another example embodiment of an article of manufacture providing a theft-proof trailer hitch tongue 300 according to the present invention. A two piece split tongue 301-302 is shown having a front portion 315 that would attach to a vehicle. A second, rear portion 331a-b of the two piece split tongue 301-302 connects the front portion to a trailer 110. A front portion 311a of the left arm 301 of the two piece split tongue 301-302 couples to a cradle 314 after the rear portion 101a-b as a pair of tongues 301-302 engage corresponding pair of receivers 102a-b on the trailer 110.

Electrical connections 321 to the trailer 110 electrically couple to a hitch connector 322a on a cable 323. A vehicle connector 322b on an opposite end of the cable 323 connects to the vehicle. In most embodiments, the existing trailer 110 and/or the section of its tongue frame 103 is held up by the use of the pivot jack 106a. Once the arms 301-302 are inserted into the receivers and secured by the pins 104, and 301 and 302 are latched together in the cradle, the second jack 312 is then lowered and the first jack 106a is retrieved up and pivoted back against the trailer frame 103. Once the second jack 312 is set on the ground, it raises or lowers the entire tongue 400, frame 103 and trailer 110 to a point where a ball receiver 402 can sit on the hitch ball to tow the trailer.

To install the theft-proof trailer hitch tongue 100 to a trailer 110, the right arm 302 has its tongue 101b inserted into its mating receiver 102b. The right arm 302 is rotated within the receiver 102b until the female notches 602a-b capture the mating locking pegs 601a-b on tongue 101b at the end of the right arm 302. The left arm 301 next has its tongue 101a inserted into its mating receiver 102a. The left arm 301, if it has the locking feature too, is rotated within the receiver 102a until the female notches 602a-b capture the mating locking pegs 601a-b on tongue 101a at the end of the left arm 301. If the left arm 301 does not have the locking feature, the procedure is the same except there are no female notches 602a-b and no male pegs 601a-b to line up. In either event, the front portion 311a of the left arm 301 engages the cradle 314 on a front portion 311b of the right arm 302.

FIG. 3b shows a front connecting end 311a of the left arm 301 inserted into a notch 341 in the cradle 314. The cradle 314 provides a notch 341 to capture the front portion 311a of the left arm 301. A latch 316 is attached to the front portion 311b of the right arm 302 by a hinge 317 at one end of the latch 316. The latch 316 may be locked into place using many known methods. In a preferred embodiment, the latch with a tension arm like a "Ratchet Load Binder" that is used to strap heavy loads, so that once you cross mid-point pulling it down, it secures itself until you release it by pulling it back up. The latch arm 316 to show, will have a flange with a pin hole 318 on the end of the latch arm 316 that will be lowered and aligned into an upright peg 319 with a pin hole, then pinned into place with a pin 320.

The latch 316 has a flange with a pin hole 318, that when closed, lines up with an upright peg with a pin hole 319 that is attached to 311b, then is pinned in place with a pin 320. With the latch 316 locked, and the pins 104 inserted into the receivers 102a-b, the arms 301-302 cannot rotate to permit the arms from being removed, and further, as long as one section or arm 301-302 has the locking feature, the latch 316 prevents that particular section or arm 301-302 from being rotated upward to be removed by clearing the female notches 602a-b and pegs 601a-b. A locking loop 318 is located at an opposite end of the latch 316. With the latch 316 locked, the arms 301-302 cannot rotate to permit the arms from being removed by the female notches 602a-b and pegs 601a-b.

Figure 4:
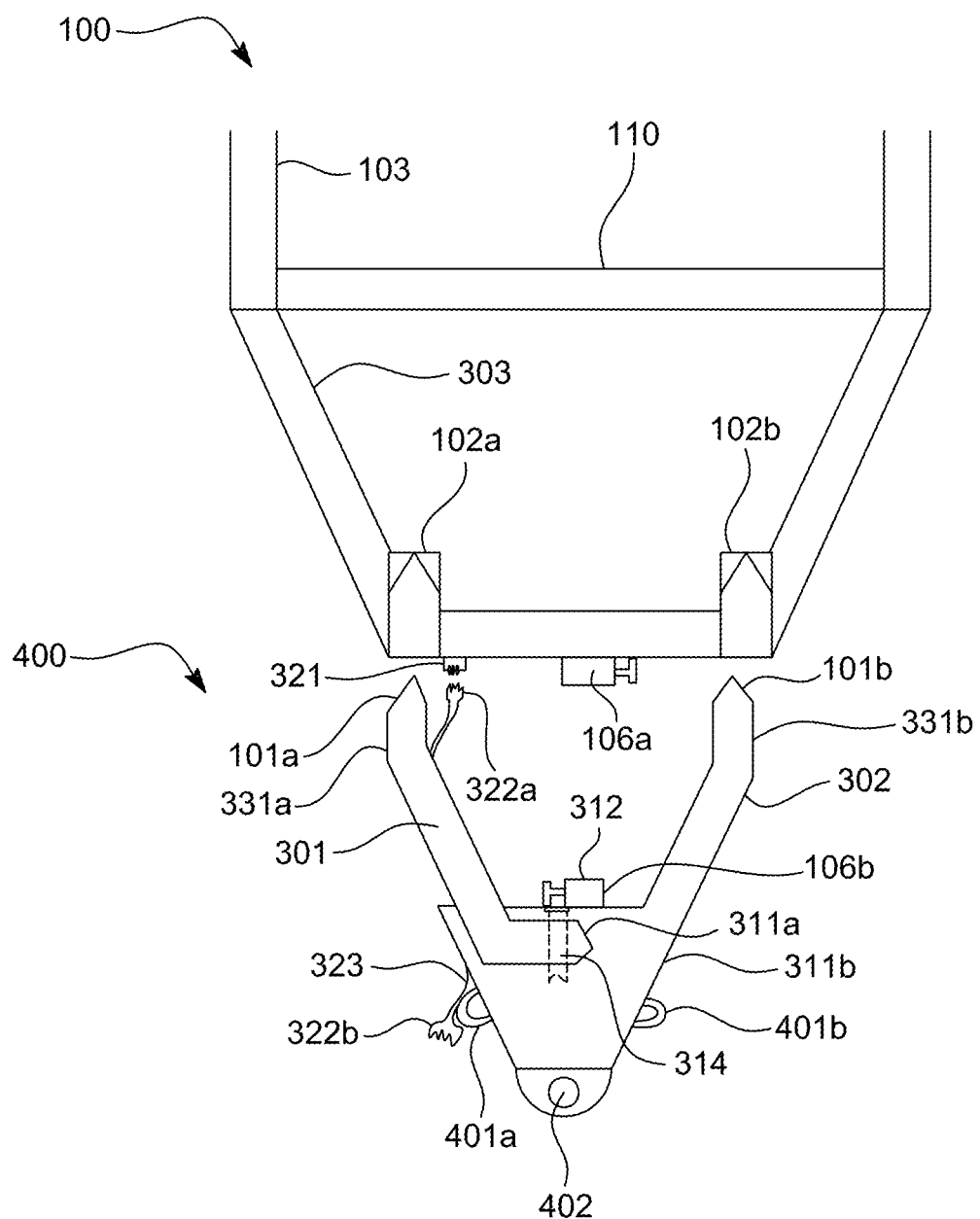
FIG. 4 illustrates a top view of a functional diagram of an article of manufacture providing a retro-fit theft-proof trailer hitch tongue attaching to a trailer tongue frame according to the present invention.

FIG. 4 illustrates a functional diagram of an article of manufacture providing a retro-fit theft-proof trailer hitch tongue 400 attached to a trailer frame 103 tongue according to the present invention. With a two arm tongue 301-302, configurations could be that the key locking side 311a of the split tongue can be removed, and the remaining side, instead of being removed, can pivot or swivel against the trailer which would save space, or, both sides can be completely removed.

The key locking sections, or arms 101a-b can be retrofitted onto an existing trailer 110 at any point on its frame 103, or can be fitted at any point in the existing trailer's tongue 303 by installing the receivers 102a-b at whatever point is desired. Safety chain loops 401a-b and a hitch ball 402 may be attached to a front portion 311b of the right arm 302 to secure the theft-proof trailer hitch tongue 400 to a vehicle (not shown).

Figure 5:
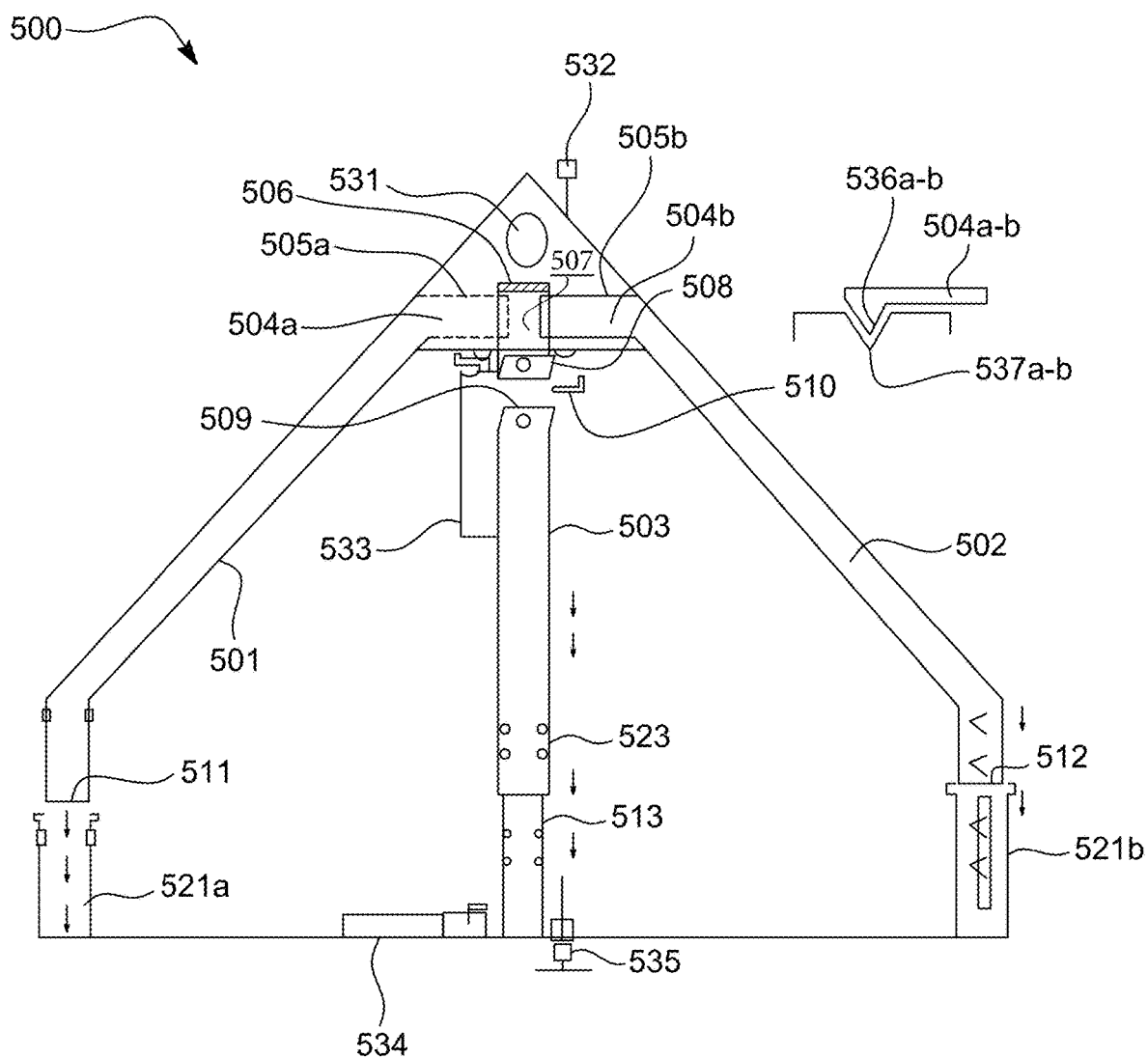
FIG. 5 illustrates a top view an example embodiment of an article of manufacture providing a theft-proof trailer hitch tongue having 3 arms or sections connected to a trailer according to the present invention.

FIG. 5 illustrates an example embodiment of an article of manufacture providing a theft-proof trailer hitch tongue 500 connected to a trailer hitch according to the present invention. With a three arm tongue (two sides 501-502 and center 503), configurations could be that all can be removed, or one or more, including the key locking side, can be removed with the remaining arm(s) or side(s) pivoting or swiveling against the trailer, which also saves space.

The left arm 501 has a trailer tongue 511 that engages a trailer receiver 521a at a rear end of the left arm. A left center tongue 504a engages a left center arm receiver 505a on a vehicle end of the center arm 503. A locking latch 507 with a flange with a latch pin hole 508, connected to center arm 503 by a hinge 506, is closed downward to line up with an upward peg with a peg pin hole 509 connected to 503, both pinned together with a pin 510 to secure the left center tongue 504a and the right center tongue 504b and arms 501 and 502 to the center arm 503.

Similarly, the right arm 502 has a trailer tongue 512 that engages a trailer receiver 521b at a rear end of the right arm 502. A right center tongue 504b engages a right center arm receiver 505b on a vehicle end of the center arm 503. The latch 507 is closed down over the front of both arms, and is pinned 510 through the pinhole on the flange 508 of the latch 507 through the pinhole of the peg 509 connected to the center arm 503.

As described above with reference to the two arm tongue of FIGS. 3-4, the three arm tongue 500 is constructed by inserting the arm tongues 511-512 into the trailer receivers 521a-b and rotating the arms 501-502 until the locking pins 536a-b engage a set of locking notches 537a-b. A center tongue 513 is inserted into a receiver 523 of the center arm 503 as the left center tongue 504a and the right center tongue 504b may be inserted into the left center arm receiver 505a and the right center arm receiver 505b on the center arm 503. The latch 507 when pinned 510 into place secures the three arm tongue 500 together.

A vehicle electrical connector 532 allows the vehicle to provide electrical power and signals to the trailer 110 when a trailer electrical connector 535 connects to the trailer 110. A tongue jack 533, similar to a pivot jack 534, supports the trailer 110 when the removable sections or arms 501-503 are within the mating receivers 521a-b. The pivot jack 534 performs the same function of supporting the trailer 110 the removable sections or arms 501-503 are removed from the mating receivers 521a-b.

Figure 6:
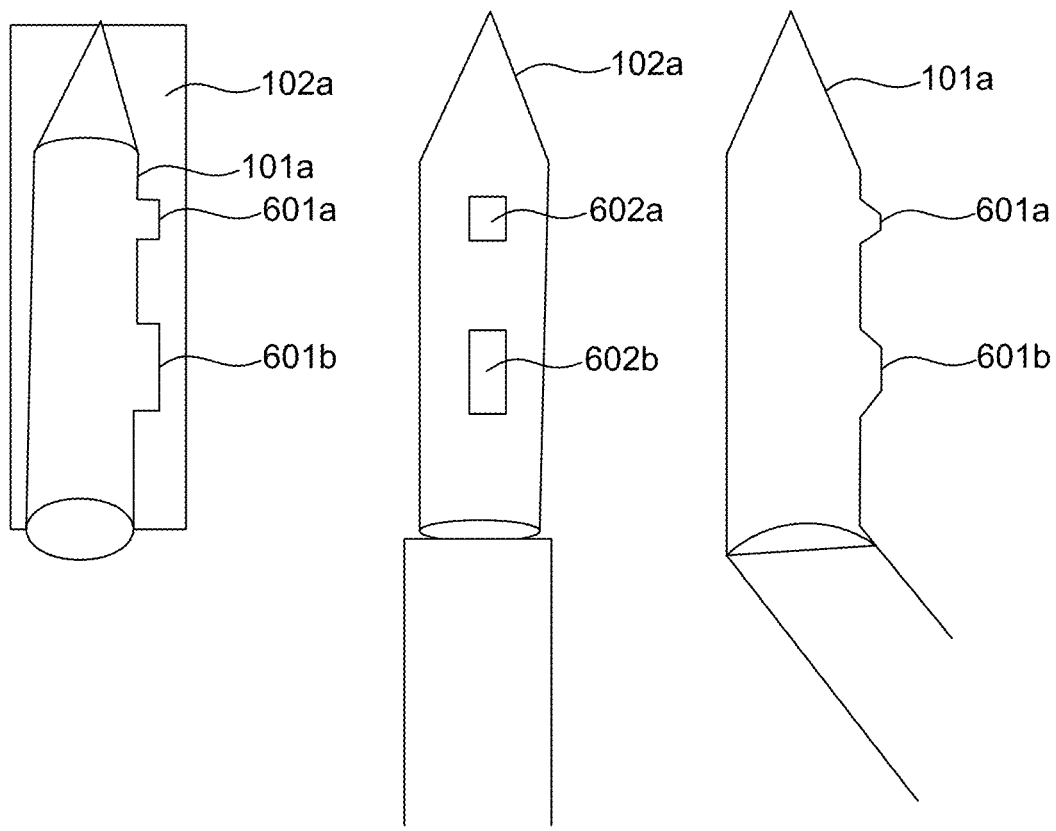
FIG. 6 illustrates a set of theft-proof trailer tongues, arms, and receivers for locking arms according to the present invention.

FIG. 6 illustrates a set of theft-proof trailer hitch tongues 101a-b according to the present invention. The tongue section or arm 101a-b with the proper sequence of aligning male pegs 601a-b is inserted into the receiver 102a-b in the upright position, and once in place and lined up with the female notches 602a-b inside the receiver 102a-b, the section or arm 101a-b is turned downward to the left or the right, depending on the side of the trailer 110, so that the male pegs 601a-b engage into the female notch openings 602a-b, thus locking said section or arm 101a-b in place, just like a regular key. A tongue 101a-b may have different notch 602a-b sequences for different trailers 110 so that the notched section 602a-b of the receivers 102a-b and corresponding arm 101a-b cannot be used on a different trailer 110. Any trailer 110 should be very hard to move or steal without a tongue and hitch towbar having matching patterns of pins and notches.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. An article of manufacture for providing a theft-proof trailer hitch tongue, the trailer hitch tongue comprises:
    two or more mating receivers coupled to a trailer each of the two or more mating receivers having a plurality of locking notches about an inside surface of each mating receiver in a specific orientation;
    two or more removable arms for engaging the two or more mating receivers, each of the removable arms having a hitch tongue end and a connecting end and together form a split tongue of the trailer hitch;
    a plurality of locking pegs arranged on each of the two or more removable arms, the plurality of locking pegs being configured to simultaneously engage the plurality of locking notches when the hitch tongue end of the removable arms are inserted in the corresponding mating receiver; and
    locking latches components on the connecting end of each of the removable arms, the locking latches couple together after the hitch tongue end of the removable arms are inserted in the corresponding mating receiver;
    wherein each of the removable arms rotate within the corresponding mating receiver after the hitch tongue end of the removable arms are inserted in the corresponding mating receiver permitting the locking notches and the locking pegs to engage each other simultaneously.

2. The trailer hitch tongue according to claim 1, wherein the locking latches components on the connecting ends of the two or more removable arms engage each other when a latching component of the connecting end of a first removable arm is placed within a cradle on the connecting end of a second removable arm and a latch arm pivots about a hinge coupled to the first removable arm across the latching component within the cradle to align a latch pinhole in the latch arm to a upright peg coupled to second removable arm.

3. The trailer hitch tongue according to claim 2, wherein a locking pin is inserted through the latch pinhole and a peg pinhole of the upright peg to secure the latch holding the connecting ends of the removable arms together.

4. The trailer hitch tongue according to claim 3, wherein the connecting end of the removable arm having the cradle further comprises a trailer hitch for attachment to a towing vehicle.

5. The trailer hitch tongue according to claim 1, wherein the two or more removable arms comprise:
    a left removable arm member having a left trailer tongue for engaging a left receiver on the trailer and a left center tongue on an opposite end of the left removable arm member;
    a right removable arm member having a right trailer tongue for engaging a right receiver on the trailer and a right center tongue on an opposite end of the right removable arm member; and
    a center removable arm, the center removable arm comprises:
        a center arm member having a trailer end and a receiving end;
        a left center arm receiver for accepting the left center tongue of the left removable arm after the left trailer tongue end engages the left receiver on the trailer;
        a right center arm receiver for accepting the right center tongue of the right removable arm after the right trailer tongue end engages the left receiver on the trailer; and
        a locking latch coupled to the center arm member by a latching hinge, the locking latch having a flange and a latch pinhole for engaging an upward peg with a peg pinhole coupled to the center arm member.

6. The trailer hitch tongue according to claim 5, wherein a locking pin is inserted through the latch pinhole and a peg pinhole of the upright peg to secure the latch holding the tongue ends of the removable arms within their respective receivers.

7. The trailer hitch tongue according to claim 5, wherein each of the removable arms comprises at least two locking pegs for engaging locking notches of their respective mating receivers.

8. The trailer hitch tongue according to claim 7, wherein the locking pegs on each of the removable arms have a unique orientation.

9. The trailer hitch tongue according to claim 7, wherein the center removable arm further comprises a trailer hitch for attachment to a towing vehicle.

* * * * *